US012640529B2

(12) United States Patent
Wei et al.

(10) Patent No.: US 12,640,529 B2
(45) Date of Patent: May 26, 2026

(54) ELECTRODE DEVICE AND HAIR CURLER

(71) Applicant: Shenzhen FENDA Technology Co., LTD, Shenzhen (CN)

(72) Inventors: Mianjia Wei, Shenzhen (CN); Sanping Zhang, Shenzhen (CN)

(73) Assignee: SHENZHEN FENDA TECHNOLOGY CO., LTD, Shenzhen (CN)

( * ) Notice: Subject to any disclaimer, the term of this patent is extended or adjusted under 35 U.S.C. 154(b) by 307 days.

(21) Appl. No.: 18/338,519

(22) Filed: Jun. 21, 2023

(65) Prior Publication Data

US 2023/0337803 A1 Oct. 26, 2023

(30) Foreign Application Priority Data

Jun. 22, 2022 (CN) ......................... 202221579533.6

(51) Int. Cl.
*H01R 39/00* (2006.01)

(52) U.S. Cl.
CPC .................................... *H01R 39/00* (2013.01)

(58) Field of Classification Search
CPC ........... G06F 3/00; G06F 3/02; G06F 3/0202; H01H 1/00; H01H 1/16; H01H 1/20; H01H 1/2041; H01H 1/205; H01H 1/2058; H01H 3/00; H01H 3/02; H01H 3/028; H01H 3/08; H01H 13/00; H01H 13/83; H01H 13/70; H01H 13/7065; H01H 2221/00; H01H 2221/01; H01H 2231/00; H01H 2231/012; H01H 2231/048; H01H 2233/07; H01R 4/60; H01R 4/70; H01R 11/00; H01R 11/01; H01R 11/03; H01R 39/00; H01R 39/02; H01R 39/025; H01R 39/06; H01R 39/08; H01R 39/14; H01R 39/18; H01R 24/38; H01R 24/52; H01R 24/54; H01R 24/58; H01R 2201/00; A45D 1/00; A45D 1/04; A45D 1/10; A45D 1/20; A45D 2/00; A45D 2/006; A45D 2/007
USPC .......................................................... 200/564
See application file for complete search history.

(56) References Cited

U.S. PATENT DOCUMENTS

| | | | | |
|---|---|---|---|---|
| 11,311,678 | B2 * | 4/2022 | Madsen .................. | A61M 5/31 |
| 2012/0016229 | A1 | 1/2012 | Iustin et al. | |
| 2014/0308854 | A1 * | 10/2014 | Yudate ................... | H01R 43/24 439/669 |
| 2017/0279107 | A1 | 9/2017 | Yamaoka et al. | |
| 2022/0249841 | A1 | 8/2022 | Goroszeniuk et al. | |

* cited by examiner

*Primary Examiner* — Anthony R Jimenez
(74) *Attorney, Agent, or Firm* — Andrew C. Cheng

(57) ABSTRACT

The utility model discloses an electrode device and a hair curler, and relates to the technical field of hairdressing equipment, and the electrode device comprises a connecting shaft, a plurality of electrodes and an insulating check ring, wherein the connecting shaft is used for mounting an electrode; the plurality of electrodes are sleeved on the connecting shaft, and the plurality of electrodes are sequentially arranged along the axial direction of the connecting shaft, and the electrode sleeves the periphery of the extension part. Under the condition that the axial dimension of the electrode device is not prolonged, the distance between two adjacent electrodes is prolonged, the electric reaction between two adjacent electrodes can be effectively avoided, and the occupied space of the electrode device is reduced.

18 Claims, 7 Drawing Sheets

ELECTRODE DEVICE AND HAIR CURLER

FIELD OF THE INVENTION

The utility model relates to the technical field of hairdressing equipment, in particular to an electrode device. In addition, the invention also relates to a hair curler comprising the electrode device.

BACKGROUND OF THE INVENTION

In the prior art, the power supply to the rotation module is generally provided by the electrode device, and the adjacent electrodes are isolated by using an insulating ring; because a certain gap exists at the bottom of the connecting bottom of the insulating ring, when the width of the insulating ring is small, an electrical reaction is generated between adjacent electrodes, thereby causing adverse consequences such as short circuit; in order to avoid such situations, the width of the insulating ring is usually increased, thereby increasing the space occupied by the electrode device, further increasing the volume of the product and increasing the cost.

In summary, how to reduce the space occupied by the electrode device is a problem to be solved by those skilled in the art.

SUMMARY OF THE UTILITY MODEL

In view of this, it is an object of the present Utility model to provide an electrode apparatus, which can effectively prolong the distance between two adjacent electrodes and reduce the overall axial size of the electrode apparatus, thereby reducing the space occupied by the electrode apparatus.

Another object of the present invention is to provide a hair curler comprising the above electrode arrangement.

In order to achieve the above object, the present Utility model provides the following technical solutions:

An electrode apparatus includes:

A connecting shaft for mounting an electrode;

The plurality of electrodes are sleeved on the connecting shaft, and the plurality of electrodes are sequentially arranged along the axial direction of the connecting shaft;

An insulating check ring, sleeved on the connecting shaft, and the insulating check ring is arranged between adjacent electrodes;

The insulating retainer ring comprises an annular main body part and an annular extension part extending in the axial direction, the outer diameter of the main body part is larger than the outer diameter of the extension part, and the electrode sleeves the periphery of the extension part.

Optionally, an extending length of the extending portion in the axial direction is greater than or equal to a size of the corresponding electrode in the axial direction.

Optionally, the main body portion and the extension portion are of an integrated structure.

Optionally, the electrode is of an annular structure, and a difference between an inner diameter and an outer diameter of the main body portion is greater than or equal to a difference between an inner diameter and an outer diameter of the corresponding electrode.

Optionally, the connecting shaft is provided with a stage section and a mounting section, an outer diameter of the stage stage is equal to an outer diameter of the extending portion, one of the electrodes is sleeved at the stage stage, and the insulating stop ring is sleeved on the mounting section.

Optionally, the electrode device includes an electrode base and a static electrode disposed on the electrode base, the static electrode is disposed in one-to-one correspondence with the electrode, and the static electrode is in contact with the electrode and is wrapped around an outer circumference of the electrode.

Optionally, the electrode apparatus further includes an electrode pressing plate for pressing and fixing the static electrode to the electrode holder.

Optionally, a planar portion is disposed at a position where the static electrode is in contact with the electrode base, the electrode pressing plate is a rectangular plate, the rectangular plate is in contact with the planar portion, and the rectangular plate is fixedly disposed on the electrode base.

Optionally, the electrode device comprises an end cap fixedly arranged at an end of the connecting shaft, and the end cap is used for axially compressing the electrode and the insulating retainer ring.

A hair curler comprises the electrode device according to any one of the above.

In the process of using the electrode device provided by the present invention, the electrode and the insulating check ring are sleeved on the connecting shaft, so that the adjacent electrodes are separated by the insulating check ring, and the insulating check ring 3 includes a main body portion and an extension portion, and the distance between the adjacent two electrodes is the distance between the end portion of the extension portion of the same insulating check ring and the end portion of the main body portion or the distance between the end portions of the extension portions of two adjacent insulating check rings.

Compared with the prior art, the invention prolongs the distance between two adjacent electrodes without prolonging the axial dimension of the electrode device, effectively avoids the electric reaction between two adjacent electrodes, and reduces the occupied space of the electrode device.

In addition, the invention also provides a hair curler comprising the electrode dev ice.

In addition, the invention also provides a hair curler comprising the electrode device.

BRIEF DESCRIPTION OF DRAWINGS

In order to more clearly illustrate the technical solutions in the present utility or the prior art, the accompanying drawings used in the description of the embodiments or the prior art will be briefly introduced below, it will be apparent that the drawings in the following description are only embodiments of the present invention, and for those of ordinary skill in the art, other drawings may be obtained according to the provided drawings without creative work.

In FIG. 1 to FIG. 7:

Figure 1:
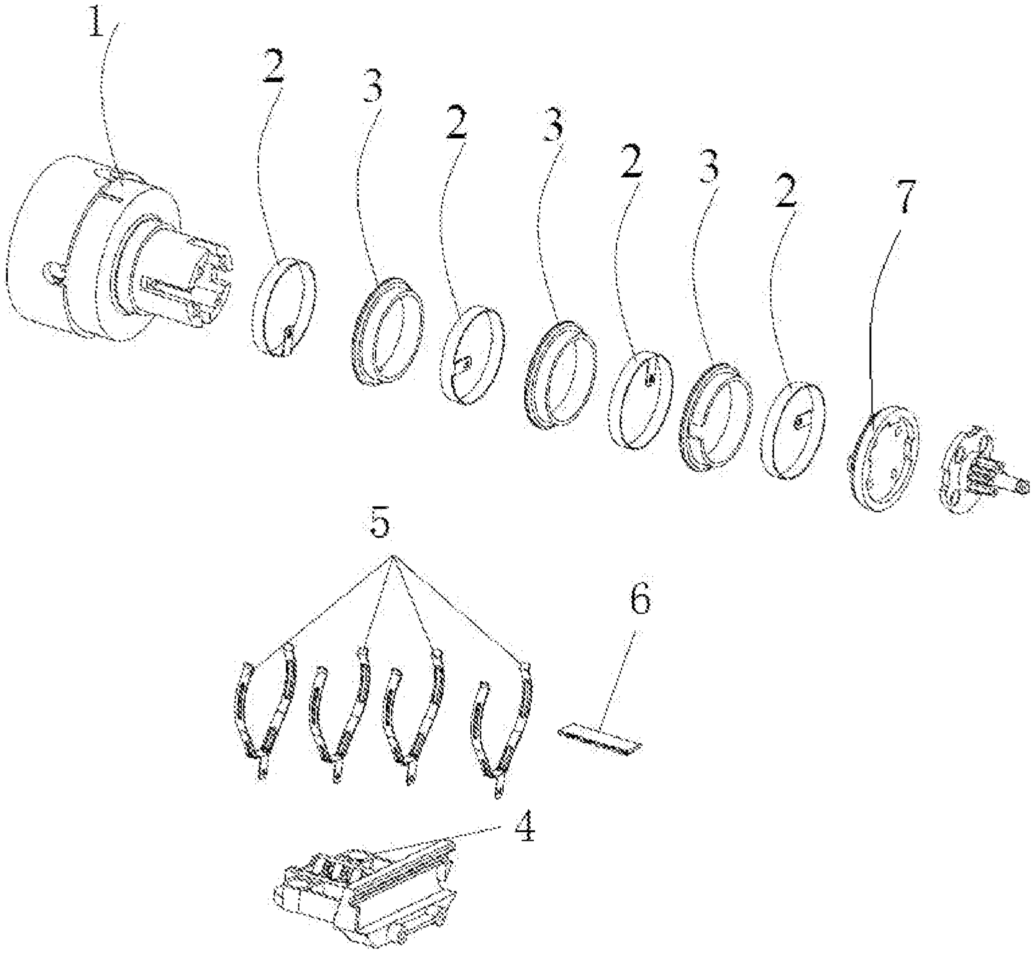
FIG. 1 is an exploded view of a specific embodiment of an electrode device provided by the present invention.

1 connecting shaft, 2 electrode, 3 insulating check ring, 31 main body part, 32 extension part, 4 electrode seat, 5 static electrode, 6 electrode pressing plate, 7 end cover.

DETAILED DESCRIPTION OF THE PREFERRED EMBODIMENTS

The technical solutions in the embodiments of the present invention will be clearly and completely described below with reference to the accompanying drawings in the embodiments of the present invention, and obviously, the described embodiments are only a part of the embodiments of the present invention, and not all embodiments. All other embodiments obtained by those of ordinary skill in the art without creative efforts shall fall within the scope of the present invention.

The core of the present invention is to provide an electrode apparatus, which can effectively prolong the distance between two adjacent electrodes and reduce the overall axial size of the electrode apparatus, thereby reducing the space occupied by the electrode apparatus.

Another core of the present utility is to provide a hair curler including the above electrode arrangement.

Please refer to FIGS. 1-7.

An embodiment of the present disclosure provides an electrode apparatus, including:

A connecting shaft 1 for mounting the electrode 2;

The plurality of electrodes 2 are sleeved on the connecting shaft 1, and the plurality of electrodes 2 are sequentially arranged along the axial direction of the connecting shaft 1.

The insulating check ring 3 is sleeved on the connecting shaft 1, and an insulating check ring 3 is arranged between the adjacent electrodes 2.

The insulating retainer ring 3 includes an annular main body portion 31 and an annular extending portion 32 extending in the axial direction, an outer diameter of the main body portion 31 is greater than an outer diameter of the extending portion 32, and the electrode 2 is sleeved on an outer periphery of the extending portion 32.

Figure 2:
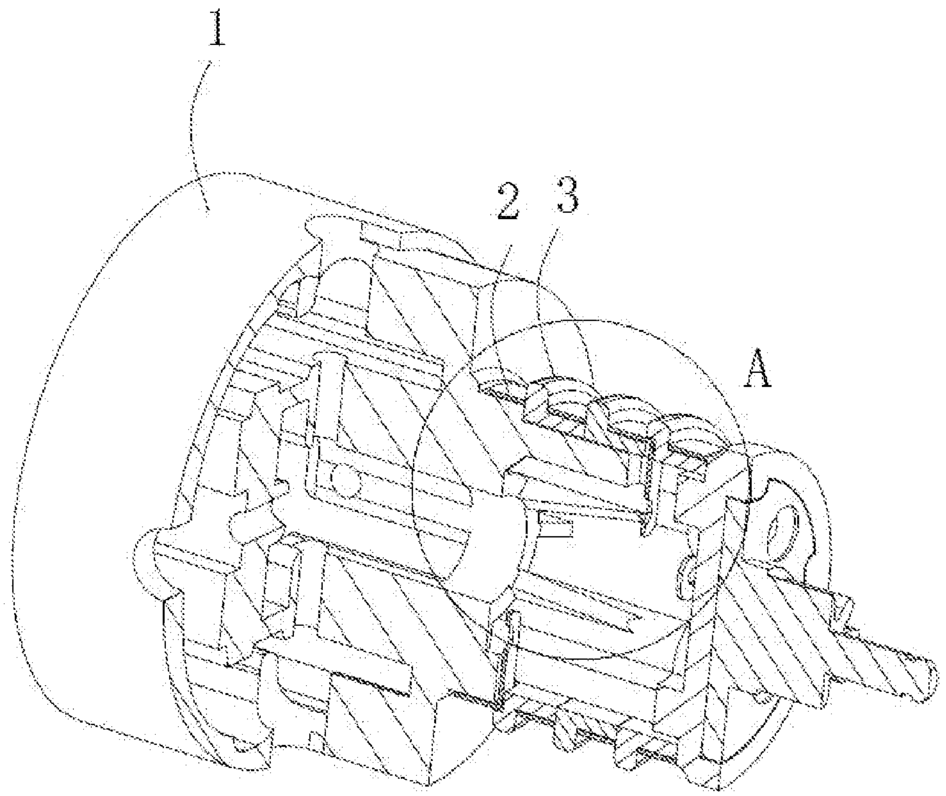
FIG. 2 is a partial cross-sectional view of a specific embodiment of an electrode device provided by the present invention.

In a specific installation process, as shown in FIG. 1 and FIG. 2, one electrode 2 may be sleeved on the connecting shaft 1, then one insulating check ring 3 is sleeved on the connecting shaft 1, and the main body portion 31 of the insulating check ring 3 is in contact with the electrode 2 sleeved on the connecting shaft 1; then the other electrode 2 is sleeved on the extending portion 32 of the insulating check ring 3; and then another insulating check ring 3 is installed, so that the mounting of the electrode 2 and the insulating check ring 3 is achieved. Of course, the insulating check ring 3 may be installed first, the insulating check ring 3 is sleeved on the connecting shaft 1, then the electrode 2 is installed, the electrode 2 is sleeved on the extending portion 32 of the insulating check ring 3 installed on the connecting shaft 1, and then one insulating check ring 3 is installed to the connecting shaft 1, so that the mounting of the electrode 2 and the insulating check ring 3 is achieved.

The electrode 2 mentioned in this embodiment may be a dynamic electrode or a static electrode, which is specifically determined according to actual conditions.

It should be noted that the number of the electrodes 2 mentioned in this specific embodiment may be the same as the number of the insulating check rings 3, or may be as shown in FIG. 1 and FIG. 2, and the number of the insulating check rings 3 is one less than the number of the electrodes 2; specifically, it is determined according to actual conditions, and details are not described here in again.

Figure 4:
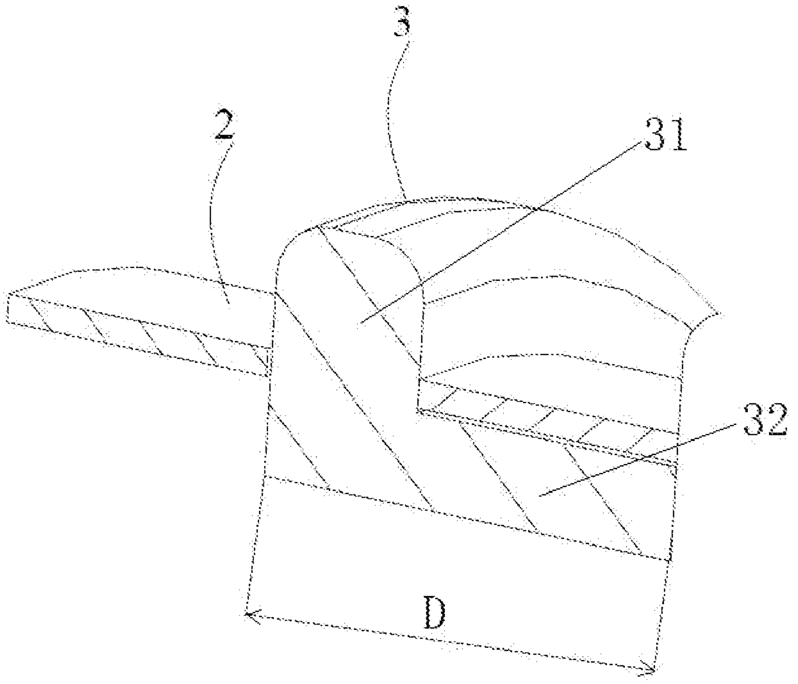
FIG. 4 is a schematic diagram of a distance between two adjacent electrodes.

In the process of using the electrode apparatus provided in this embodiment, the electrode 2 and the insulating check ring 3 are sleeved on the connecting shaft 1, so that the adjacent electrodes 2 are spaced by the insulating check ring 3, and the insulating check ring 3 includes a main body portion 31 and an extension portion 32, as shown in FIG. 4, the distance between the adjacent two electrodes 2 is the distance D between the end portion of the extension portion 32 of the same insulating check ring 3 and the end portion of the main body portion 31, where D is the distance between the end portion of the extension portion 32 of the same insulating check ring 3 and the end portion of the main body portion 31; or the distance between the adjacent two electrodes 2 that is electrically reacted is the distance between the end portions of the extension portions 32 of the two adjacent insulating check rings 3.

Compared with the prior art, the present specific embodiment prolongs the distance between two adjacent electrodes 2 without prolonging the axial dimension of the electrode device, and can effectively avoid an electrical reaction between two adjacent electrodes 2 and reduce the space occupied by the electrode device.

In a specific embodiment, the extending length of the extending portion 32 in the axial direction may be greater than or equal to the size of the corresponding electrode 2 in the axial direction, and after the electrode 2 is sleeved on the extending portion 32 of the corresponding insulating check ring 3, the extending portion 32 may completely cover the electrode 2 in the extending direction, so as to prolong the distance between two adjacent electrodes 2 as much as possible, further avoiding an electrical reaction between two adjacent electrodes 2, and reducing a space occupied by the electrode device.

On the basis of the above embodiments, the main body portion 31 and the extension portion 32 may be provided as a one-piece structure, and the arrangement of the one-piece structure may facilitate the installation of the insulation check ring 3, and avoid the gap between the main body portion 31 and the extension portion 32 affecting the quality of the electrode apparatus.

Of course, the insulating retainer ring 3 may also be provided as a split structure, but the main body portion 31 and the extending portion 32 need to meet the insulating effect when assembled, thereby avoiding the electrical connection between the two adjacent electrodes 2 due to the gap between the main body portion 31 and the extending portion 32.

Preferably, the electrode 2 may be an annular structure, and a difference between an inner diameter and an outer diameter of the main body portion 31 is greater than or equal to a difference between an inner diameter and an outer diameter of the corresponding electrode 2. After the electrode 2 is sleeved on the extending portion 32 of the corresponding insulating check ring 3, the insulating check ring 3 may completely cover the electrode 2 in the radial direction, thereby avoiding an electrical reaction between the adjacent electrodes 2, and further improving the insulation effect.

Figure 3:
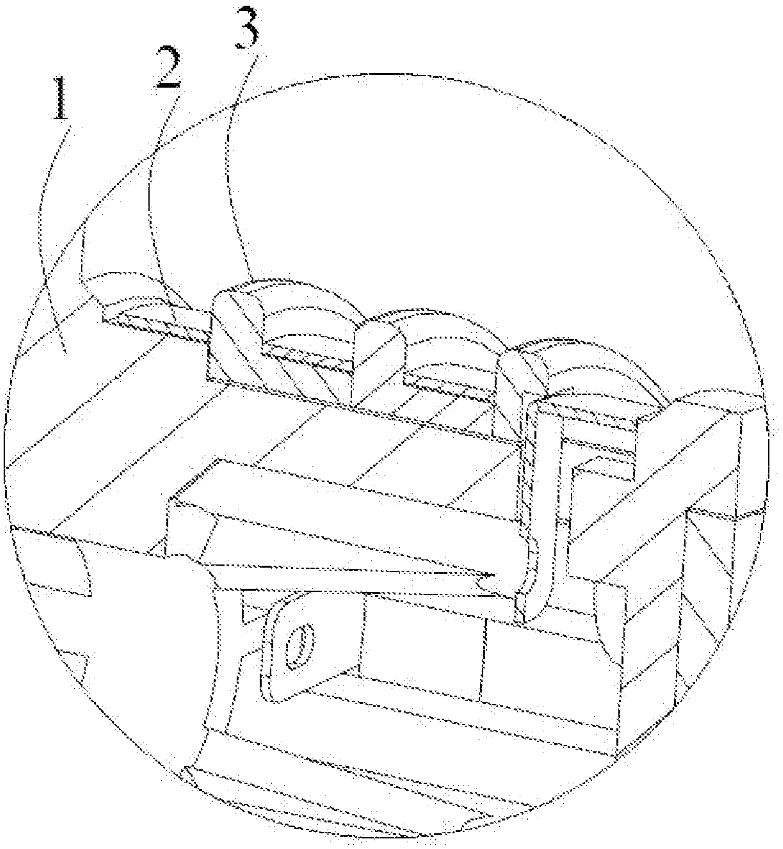
FIG. 3 is a partial enlarged view of part A in FIG. 2.

As shown in FIG. 1 and FIG. 3, the connecting shaft 1 is provided with a stage stage and a mounting section, the outer diameter of the stage stage is equal to the outer diameter of the extending portion 32, one electrode 2 is sleeved in the stage stage, and the insulating check ring 3 is sleeved on the mounting section; in the actual mounting process, it may be the case that the first electrode 2 may be directly sleeved on the connecting shaft 1 without being sleeved on the insulating check ring 3, therefore, the stage section and the mounting section may be set on the connecting shaft 1, the outer diameter of the stage stage is greater than the outer diameter of the mounting section, the first electrode 2 may be directly mounted in the stage stage, the insulating check ring 3 is mounted in the mounting section, the further electrode 2 needs to be installed in the extending portion 32 of the insulating check ring 3, the outer diameter of the stage stage is set to be equal to the outer diameter of the extending portion 32, the mounting of the electrode 2 with the same inner diameter may be more convenient, and the coaxial mounting of the electrode 2 is facilitated.

As shown in FIG. 1, the electrode device includes an electrode holder 4 and a static electrode 5 disposed on the electrode holder 4, the static electrode 5 is disposed in one-to-one correspondence with the electrode 2, and the static electrode 5 is in contact with the electrode 2 and is wrapped around an outer periphery of the electrode 2; in this embodiment, the electrode 2 may be provided as a dynamic electrode.

During specific use, the electrode holder 4 is connected to the power supply device, or directly sets a related power supply on the electrode holder 4, the power supply is connected to the static electrode 5, and the static electrode 5 is charged, the static electrode 5 is wrapped around the periphery of the electrode 2, and in the process of driving the electrode 2 to rotate by the connection shaft 1, the static electrode 5 is always in contact with the electrode 2, and the electrical connection between the static electrode 5 and the electrode 2 may be achieved. In this embodiment, the static electrode 5 and the electrode 2 are disposed in a one-to-one correspondence, and are wrapped around the periphery of the electrode 2, so that the contact reliability between the electrode 2 and the static electrode 5 can be improved, and the electrical connection effect can be improved.

Figure 5:
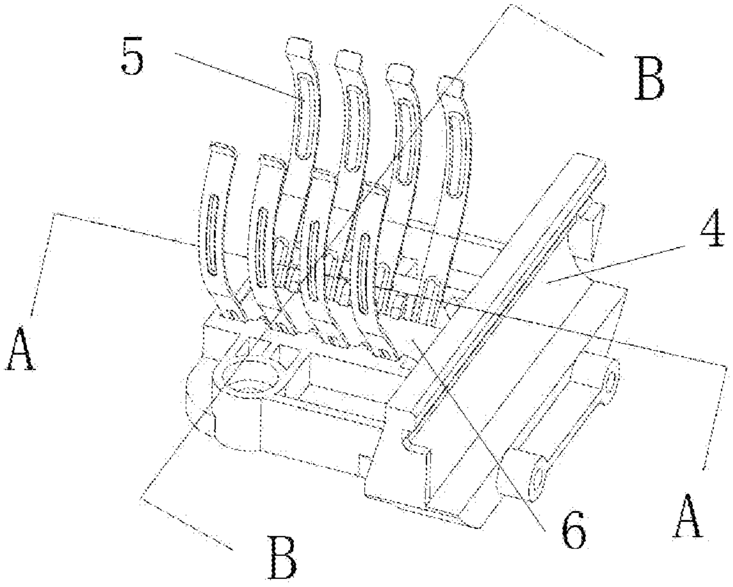
FIG. 5 is a schematic structural diagram of a static electrode mounted on an electrode holder.
Figure 6:
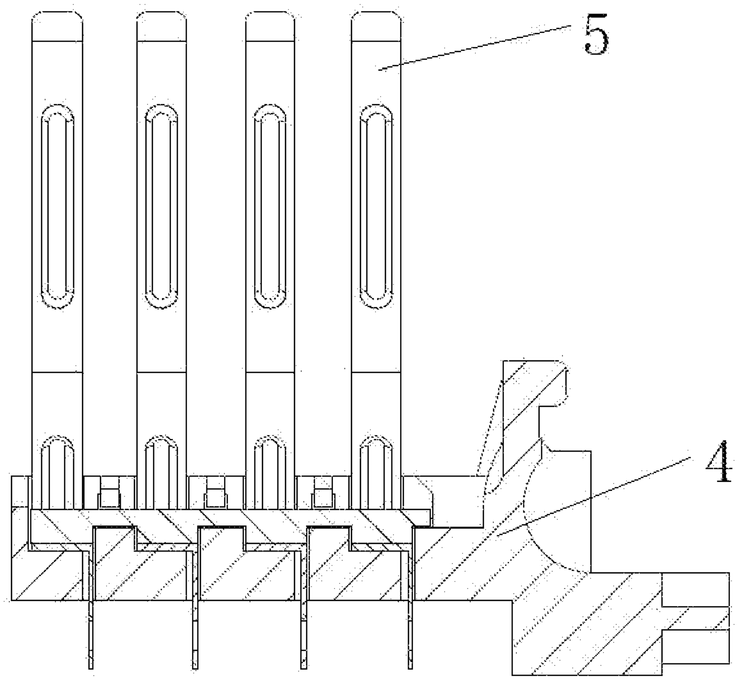
FIG. 6 is a cross-sectional view taken along line A-A in FIG. 5.
Figure 7:
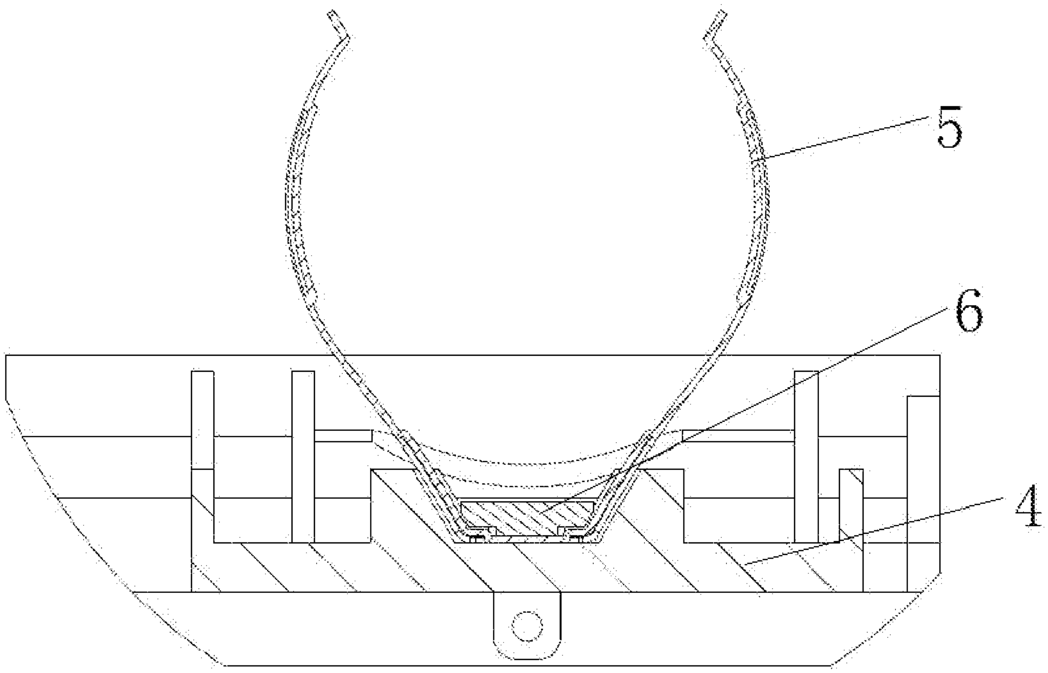
FIG. 7 is a cross-sectional view taken along line B-B in FIG. 5.

As shown in FIG. 5 and FIG. 7, the electrode apparatus further includes an electrode pressing plate 6, and the electrode pressing plate 6 is configured to press and fix the static electrode 5 to the electrode base 4; the electrode pressing plate 6 may be disposed in a one-to-one correspondence with the static electrode 5, or one electrode pressing plate 6 may be used to simultaneously fix the plurality of static electrodes 5, which is specifically determined according to actual conditions.

Specifically, a planar portion may be disposed at a position where the static electrode 5 is in contact with the electrode base 4, the electrode pressing plate 6 is a rectangular plate, the rectangular plate is in contact with the planar portion, and the rectangular plate is fixedly disposed on the electrode base 4, so that the electrode pressing plate 6 presses and fixes the static electrode 5.

In the process of using the electrode device, a force is applied to the static electrode 5 during rotation of the electrode 2, and the electrode pressing plate 6 is disposed, so that the static electrode 5 can be prevented from shaking under the driving of the electrode 2, and the electrical connection effect is improved.

As shown in FIG. 1, the electrode device comprises an end cover 7 fixedly arranged at the end of the connecting shaft 1, and the end cover 7 is used for axially compressing the electrode 2 and the insulating check ring 3; in the specific mounting process, the electrode 2 and the insulating check ring 3 can be firstly mounted on the connecting shaft 1, then the end cover 7 is mounted on the connecting shaft 1, and in the mounting process, the counter electrode 2 and the insulating check ring 3 apply acting force in the axial direction, so that the electrode 2 and the insulating check ring 3 are pressed and fixed in the axial direction, and the gap between the electrode 2 and the insulating check ring 3 is further reduced.

In addition to the above electrode apparatus, the present utility also provides a hair curler including the electrode apparatus disclosed in the above embodiment, and the structure of other parts of the hair curler may refer to the prior art, and details are not described herein again.

In a specific embodiment, the hair curler comprises a handle and the electrode device mentioned above, wherein the electrode base is fixedly arranged on the handle, the connecting shaft 1 is connected with the rotatable curling portion, in the rotation process of the curling portion, the connecting shaft 1 and the electrode 2 rotate, and the electrode 2 is always in electrical contact with the static electrode 5 to supply power to the curling portion.

The embodiments in this specification are described in a progressive manner, and each embodiment focuses on differences from other embodiments, and the same similar parts between the embodiments may refer to each other. Any combination of all the embodiments provided by the present invention is within the protection scope of this utility, which will not be repeated here.

The electrode device and the hair curler provided by the present invention are described in detail above. The principles and embodiments of the present invention are described herein with reference to specific examples, and the description of the above embodiments is only used to help understand the method and the core idea of the present invention. It should be noted that, for those of ordinary skill in the art, several modifications and modifications may also be made to the present utility without departing from the principles of the present invention, and these improvements and modifications also fall within the protection scope of the present utility.

The invention claimed is:

1. An electrode device, comprising:

a connecting shaft (1);

a plurality of electrodes (2) which are sleeved on the connecting shaft (1), the plurality of electrodes (2) being sequentially arranged along an axial direction of the connecting shaft (1); and a plurality of insulating retainer rings (3) sleeved on the connecting shaft (1), each of the plurality of insulating retainer rings (3) being arranged between adjacent two of the plurality of electrodes (2);

wherein each of the plurality of insulating retainer rings (3) comprises an annular main body part (31) and an annular extension part (32) extending in the axial direction, an outer diameter of the main body part (31) is larger than an outer diameter of the extension part (32), and at least one of the plurality of electrodes (2) is sleeved on a periphery of the extension part (32) of a corresponding one of the plurality of insulating retainer rings (3); and wherein an extension length of the extension part (32) of each of the plurality of insulating retainer rings (3) in the axial direction is longer than or equal to that of a corresponding one of the plurality of electrodes (2) sleeved thereon in the axial direction.

2. The electrode device according to claim 1, wherein the electrode device comprises an end cap (7) fixedly arranged at an end of the connecting shaft (1), and the end cap (7) is used for axially compressing the electrodes (2) and the plurality of insulating retainer rings (3).

3. The electrode device according to claim 1, wherein the electrode device comprises an end cap (7) fixedly arranged at an end of the connecting shaft (1), and the end cap (7) is used for axially compressing the plurality of electrodes (2) and the plurality of insulating retainer rings (3).

4. The electrode device according to claim 1, wherein the electrode device comprises an electrode holder (4) and multiple static electrodes (5) arranged on the electrode holder (4), the multiple static electrodes (5) are arranged in a one-to-one correspondence with the plurality of electrodes (2), and each of the multiple static electrodes (5) is in contact with a corresponding one of the plurality of electrodes (2) and is wrapped around a periphery of the corresponding one of the plurality of electrodes (2).

5. The electrode device according to claim 1, wherein the main body part (31) and the extension part (32) of each of the plurality of insulating retainer rings (3) are of an integrated structure.

6. The electrode device according to claim 5, wherein the electrode device comprises an electrode holder (4) and multiple static electrodes (5) arranged on the electrode holder (4), the multiple static electrodes (5) are arranged in a one-to-one correspondence with the plurality of electrodes (2), and each of the multiple static electrodes (5) is in contact with a corresponding one of the plurality of electrodes (2) and is wrapped around a periphery of the corresponding one of the plurality of electrodes (2).

7. The electrode device according to claim 5, wherein the electrode device comprises an end cap (7) fixedly arranged at an end of the connecting shaft (1), and the end cap (7) is used for axially compressing the plurality of electrodes (2) and the plurality of insulating retainer rings (3).

8. The electrode device according to claim 1, wherein each of the plurality of electrodes (2) is of an annular structure, and a difference between an inner diameter and an outer diameter of the main body part (31) of each of the plurality of insulating retainer rings (3) is greater than or equal to a difference between an inner diameter and an outer diameter of a corresponding one of the electrodes (2).

9. The electrode device according to claim 8, wherein the electrode device comprises an electrode holder (4) and multiple static electrodes (5) arranged on the electrode holder (4), the multiple static electrodes (5) are arranged in a one-to-one correspondence with the plurality of electrodes (2), and each of the multiple static electrodes (5) is in contact with a corresponding one of the plurality of electrodes (2) and is wrapped around a periphery of the corresponding one of the plurality of electrodes (2).

10. The electrode device according to claim 8, wherein the electrode device comprises an end cap (7) fixedly arranged at an end of the connecting shaft (1), and the end cap (7) is used for axially compressing the plurality of electrodes (2) and the plurality of insulating retainer rings (3).

11. The electrode device according to claim 1, wherein the connecting shaft (1) comprises a stage section and a mounting section, an outer diameter of the stage section is equal to that of each of the extension parts (32) of the plurality of insulating retainer rings (3), one of the plurality of electrodes (2) is sleeved on the stage section, and the plurality of insulating retainer rings (3) are sleeved on the mounting section.

12. The electrode device according to claim 11, wherein the electrode device comprises an electrode holder (4) and multiple static electrodes (5) arranged on the electrode holder (4), the multiple static electrodes (5) are arranged in a one-to-one correspondence with the plurality of electrodes (2), and each of the multiple static electrodes (5) is in contact with a corresponding one of the plurality of electrodes (2) and is wrapped around a periphery of the corresponding one of the plurality of electrodes (2).

13. The electrode device according to claim 11, wherein the electrode device comprises an end cap (7) fixedly arranged at an end of the connecting shaft (1), and the end cap (7) is used for axially compressing the plurality of electrodes (2) and the plurality of insulating retainer rings (3).

14. The electrode device according to claim 1, wherein the electrode device comprises an electrode holder (4) and multiple static electrodes (5) arranged on the electrode holder (4), the multiple static electrodes (5) are arranged in a one-to-one correspondence with the plurality of electrodes (2), and each of the multiple static electrodes (5) is in contact with a corresponding one of the plurality of electrodes (2) and is wrapped around a periphery of the corresponding one of the plurality of electrodes (2).

15. The electrode device according to claim 14, wherein the electrode device further comprising an electrode pressing plate (6) for pressing and fixing the multiple static electrodes (5) to the electrode holder (4).

16. The electrode device according to claim 15, wherein a planar portion is disposed at a position where each of the multiple static electrodes (5) is in contact with the electrode holder (4), the electrode pressing plate (6) is a rectangular plate, the rectangular plate is in contact with the planar portions, and the rectangular plate is fixedly disposed on the electrode holder (4).

17. An electrode device, comprising:

a connecting shaft (1);

a plurality of electrodes (2) which are sleeved on the connecting shaft (1), the plurality of electrodes (2) being sequentially arranged along an axial direction of the connecting shaft (1); and a plurality of insulating retainer rings (3) sleeved on the connecting shaft (1), each of the plurality of insulating retainer rings (3) being arranged between adjacent two of the plurality of electrodes (2);

wherein each of the plurality of insulating retainer rings (3) comprises an annular main body part (31) and an annular extension part (32) extending in the axial direction, an outer diameter of the main body part (31) is larger than an outer diameter of the extension part (32), and at least one of the plurality of electrodes (2) is sleeved on a periphery of the extension part (32) of a corresponding one of the plurality of insulating retainer rings (3); and wherein the connecting shaft (1) comprises a stage section and a mounting section, an outer diameter of the stage section is equal to that of each of the extension parts (32) of the plurality of insulating retainer rings (3), one of the plurality of electrodes (2) is sleeved on the stage section, and the plurality of insulating retainer rings (3) are sleeved on the mounting section.

18. An electrode device, comprising:

a connecting shaft (1);

a plurality of electrodes (2) which are sleeved on the connecting shaft (1), the plurality of electrodes (2) being sequentially arranged along an axial direction of the connecting shaft (1); and a plurality of insulating retainer rings (3) sleeved on the connecting shaft (1), each of the plurality of insulating retainer rings (3) being arranged between adjacent two of the plurality of electrodes (2);

wherein each of the plurality of insulating retainer rings (3) comprises an annular main body part (31) and an annular extension part (32) extending in the axial direction, an outer diameter of the main body part (31) is larger than an outer diameter of the extension part (32), and at least one of the plurality of electrodes (2) is sleeved on a periphery of the extension part (32) of a corresponding one of the plurality of insulating retainer rings (3); and wherein the electrode device further comprises an electrode holder (4) and multiple static electrodes (5) arranged on the electrode holder (4), the multiple static electrodes (5) are arranged in a one-to-one correspondence with the plurality of electrodes (2), and each of the multiple static electrodes (5) is in contact with a corresponding one of the plurality of electrodes (2) and is wrapped around a periphery of the corresponding one of the plurality of electrodes (2).

* * * * *